April 28, 1953 — L. E. FOWLER — 2,636,487
INTERNAL-COMBUSTION ENGINE
Filed Dec. 7, 1948 — 8 Sheets-Sheet 3

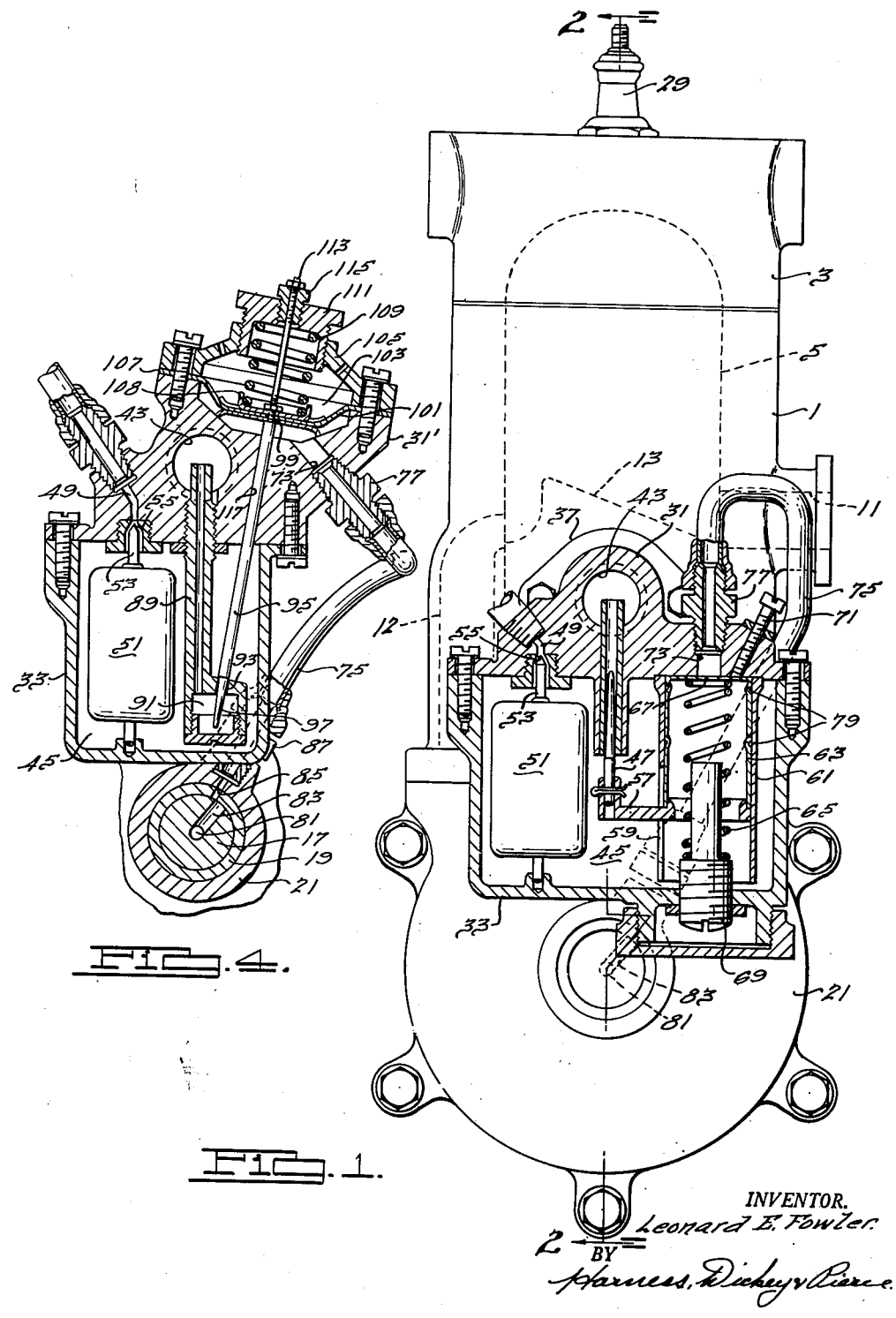

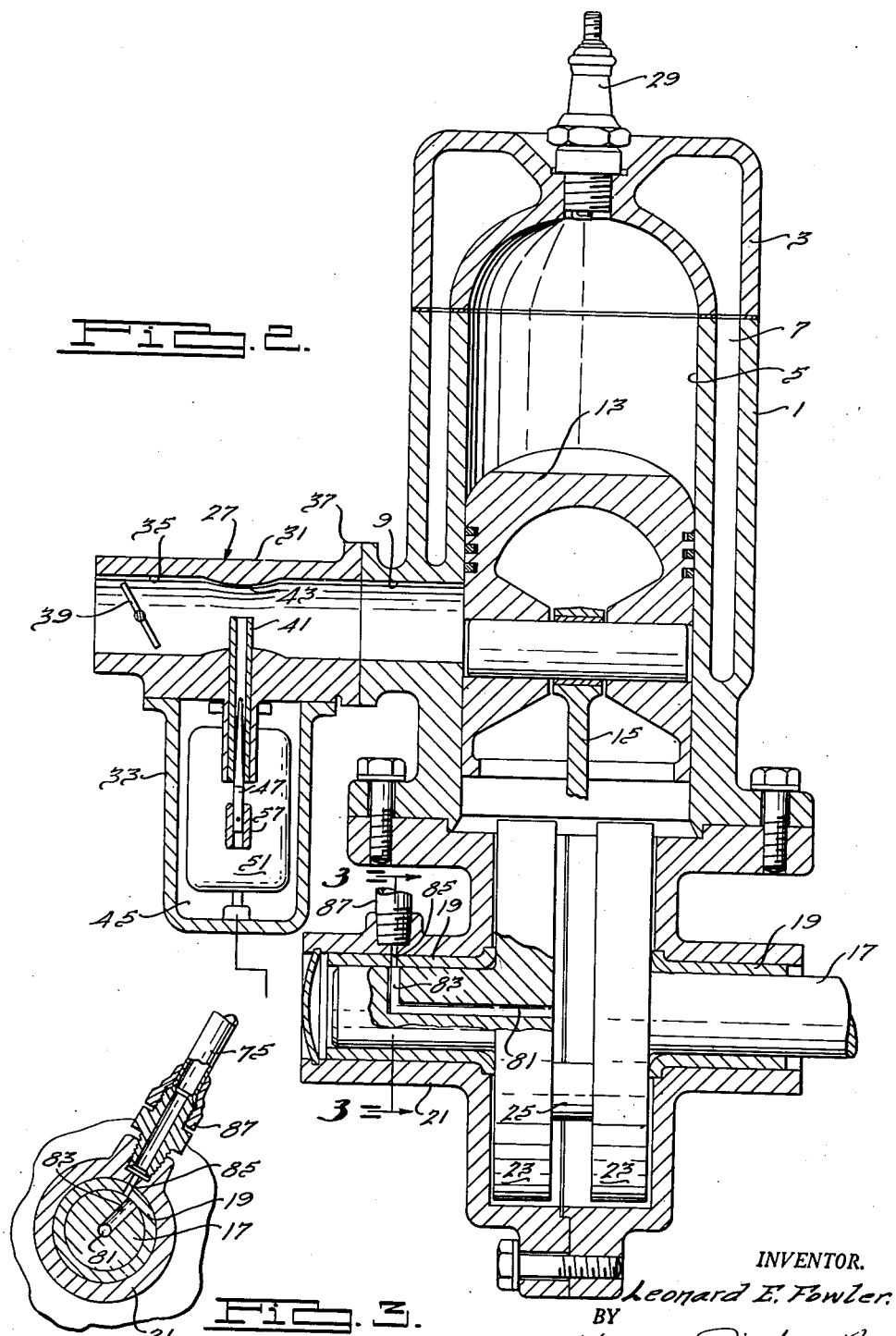

INVENTOR.
Leonard E. Fowler.
BY Harness, Dickey & Pierce
ATTORNEYS.

CRANKCASE PRESSURES
2 CYCLE ENGINE
BORE 2⅕ STROKE 2½
DISPLACEMENT 32.45 C.I.

INVENTOR.
Leonard E. Fowler.
BY
Harness, Dickey & Pierce.
ATTORNEYS.

Patented Apr. 28, 1953

2,636,487

UNITED STATES PATENT OFFICE 2,636,487

INTERNAL-COMBUSTION ENGINE

Leonard E. Fowler, Detroit, Mich.

Application December 7, 1948, Serial No. 63,964

3 Claims. (Cl. 123—73)

This invention relates to internal combustion engines and, in particular, refers to a method of and means for controlling the mixture of air and fuel.

In the thermodynamics of internal combustion engines it is well understood that the determination and the production of the optimum air-fuel mixture ratio is a difficult and complex process because of the many variables involved. The optimum value of this ratio is affected by variables such as load on the engine, temperature of the engine, operating characteristics desired; and, even if the value of this ratio is satisfactorily determined, its actual production is complicated by variables such as humidity, and atmospheric pressure and temperature, which vary with altitude as well as with weather conditions and which affect the density and weight of air introduced into the engine.

It is thus an object of the present invention to provide an improved mixture controlling mechanism adapted to compensate automatically for such variables and to simply and dependably maintain the optimum mixture ratio under a wide range of operating conditions.

From the practical standpoint there is one variable medium which satisfactorily integrates the other variables and may be made to serve as an indicator of the air-fuel mixture ratio that has been found by experience to be most satisfactory under the complex internal conditions which it indicates. This medium is the pressure of the mixture within the engine. In carrying out my invention the engine pressure is employed as an index during each compression phase or precompression phase of the operation of the engine to serve as a measure of the weight of air which has been introduced into the engine during the preceding induction phase. Such pressure is further used to control and regulate the weight of fuel introduced in order to satisfy the desired mixture ratio in view of the weight of air introduced.

It is therefore a more particular object of this invention to provide an improved method and means for utilizing the engine pressure to regulate in a desired manner the rate of fuel feed to the engine.

A further object of the invention is to provide such an improved method and apparatus whereby the air-fuel ratio is automatically variable in virtually any desired pattern in response to variances of the pressure of the charge; which pressure is, as indicated, employed as a measure of the mass of the air charge.

Other objects and advantages will become apparent upon consideration of the present disclosure in its entirety.

In the drawings:

Figure 1 is a vertical cross-sectional view of fuel metering apparatus constructed and arranged in accordance with the present invention, indicating the arrangement thereof with respect to a two-stroke-cycle gasoline engine shown somewhat diagrammatically in end elevation;

Fig. 2 is a vertical sectional view taken substantially on the line 2—2 of Fig. 1, and looking in the direction of the arrows;

Fig. 3 is a sectional view with parts broken away, taken on the line 3—3 of Fig. 2;

Fig. 4 is a vertical sectional view of a somewhat modified metering mechanism;

Fig. 12 is a fragmentary view of a modified fuel metering valve construction.

Figure 5:
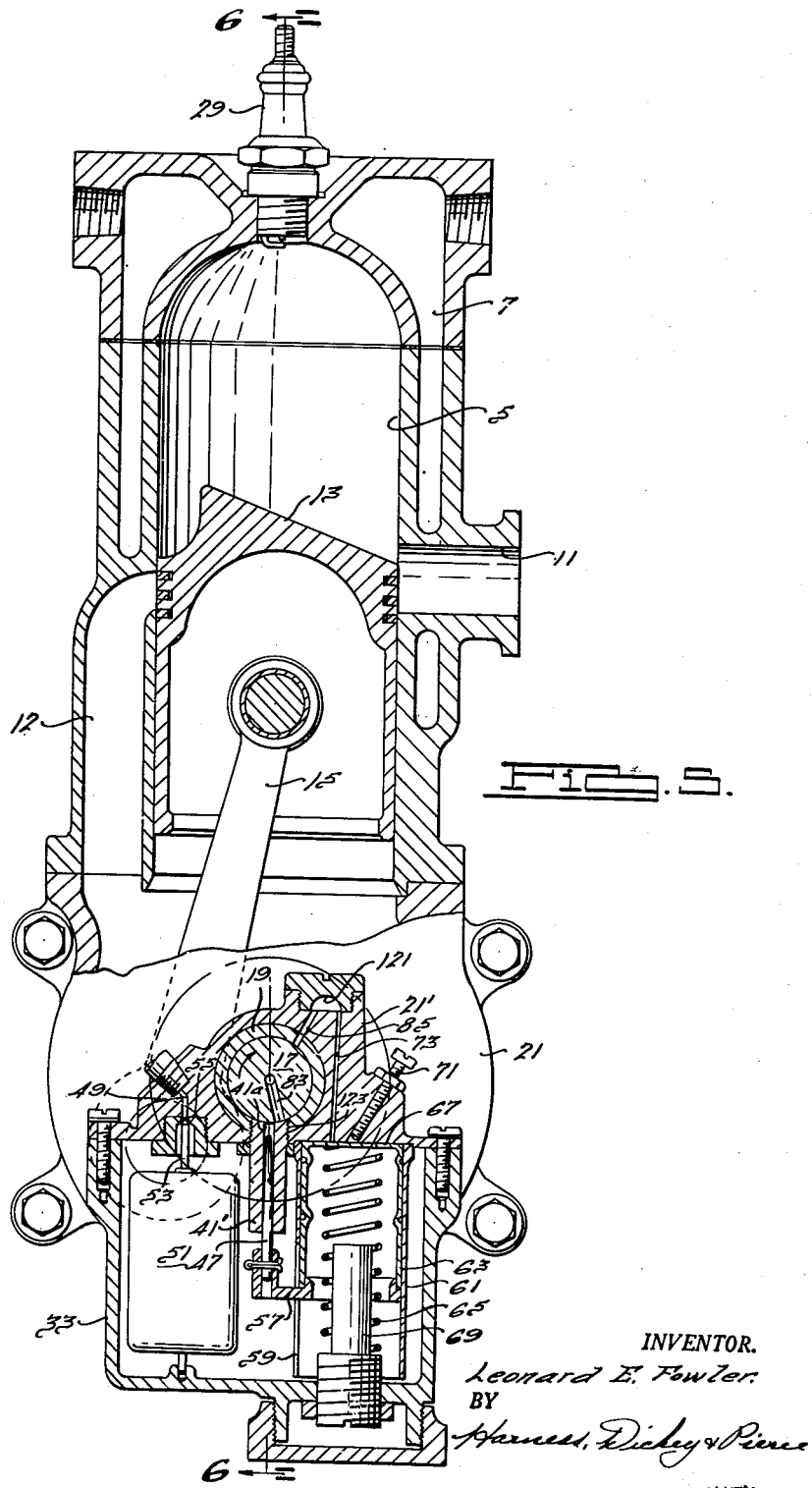
Fig. 5 is a transverse vertical sectional view of a two-stroke-cycle gasoline engine of another modified form, equipped with fuel metering mechanism according to the invention.

Referring to the drawings, and particularly to Figs. 1 to 3, the invention is illustrated in conjunction with a conventional two-stroke-cycle crankcase compression single-cylinder engine from which the manner in which the invention may be applied to multi-cylinder two-stroke-cycle engines of various constructions will be apparent to those skilled in the art.

The engine illustrated in Figs. 1–3 has a block 1 and head 3 with cooperating apertures to provide a cylinder bore 5 and a water jacket 7 surrounding the bore. The block 1 has an inlet passage 9, an exhaust passage 11, and a transfer passage 12, all of which open directly into the bore 5 and are covered or uncovered by the reciprocable piston 13 in various portions of its movement. A connecting rod 15 permits the piston 13 to rotate the crankshaft 17. The crankshaft is journaled in suitable bearings 19 in the crankcase 21 and may have spaced counterbalanced throw portions 23 joined by the pin 25 to which the rod 15 is pivotally connected. When the piston 13 is at the top of its stroke, the passage 9 is uncovered so that a mixture of air and fuel from the carbureting mechanism 27, which is connected to passage 9, flows into the crankcase 21 where it is compressed by the piston on its downward stroke. At or near the bottom of its stroke, the piston 13 uncovers the exhaust passage 11 to permit the escape of burned gases and also uncovers the transfer passage 12 so that the fuel mixture under compression in the crankcase passes into the cylinder 5 above the piston where it is compressed further on the upward stroke and then fired by the plug 29.

As hereinabove indicated, the pressure of the mixture in the crankcase is a function of the mass of the air charge and is employed to regulate the rate of fuel feed, to modify effect of the conventional throttle control in such manner as to compensate for variations in the air charge, and so maintain most efficient engine operation despite such variations. I prefer to use the crankcase pressure as such a regulating factor during only a relatively brief portion of the cycle comprising a portion within which the pressure is substantially constant. This portion may comprise an interval such as that designated 22 in Fig. 11 when both the inlet port 9 and the transfer port 12 are closed by the piston 13, which is at about 120° past top dead center, although it will be recognized that this is subject to variation. In order to prevent fluctuations I also prefer that the crankcase pressure be operatively connected to the regulating mechanism for only a brief period during each cycle. As shown, this period may be of the order of ten degrees of the cycle.

The specific features of design of pressure-responsive mechanism may also be varied widely in the practical application of my invention. This mechanism is designed to meter the fuel in such manner as to maintain the most desirable ratio under varying operating conditions and at different speeds.

One form of pressure-responsive carbureting or regulating mechanism 27 which may be employed is shown in Figs. 1 to 3, and includes a cover 31 and a housing 33 affixed thereto in a suitable manner. The cover 31 has an air inlet passage 35 therein and is attached by a flange 37 to the block 1 so that the inlet passages 35 and 9 are in alignment. The quantity of air flowing through the passage 35 may be regulated in the usual manner by the throttle valve 39. The cover 31 carries a tube 41 which projects into the venturi throat 43 of the passage 35 to provide the fuel jet. The tube 41 receives fuel from the chamber 45 of the housing 33, the fuel flow being regulated by the tapered metering pin 47 which is slidable in the tube. In addition to its taper, the pin 95 may be longitudinally contoured to vary the air/fuel ratio in a manner which will become self-evident hereinafter.

Fuel from any suitable source is admitted to the chamber 45 through a passage 49 which may be formed in the cover 31. The level of fuel in the chamber 45 may be controlled by a float 51 therein which has a tapered plunger 53 which, when the float reaches a predetermined level, engages a tapered seat 55 in the passage 49 to prevent further flow of fuel to the chamber 45.

In order to facilitate its adjustment relative to the tube 41, the metering pin 47 has a transverse arm 57 suitably affixed thereto. The arm 57 is slidable in a suitable slot 59 in a cylinder 61 that is provided within the housing 33. It is rigidly connected by suitable means to a piston 63 that moves within the cylinder. This piston is yieldably urged in an upward direction by means of a compression spring 65 which is inserted between the underside of the upper piston surface 67 and a shoulder formed on an adjusting plug 69 that is threaded into the housing 33 to provide means for regulating the resilient biasing force on the piston. An adjusting screw 71 may be threaded into the cover 31 and directed to bear upon the top 67 of the piston 63 so as to limit its upward movement and thus the minimum size opening which the pin 47 can produce in the jet tube 41. The cover 31 is provided with a passage 73 which opens onto the top 67 of the piston 63. The conduit 75 is connected at one end to means responsive to variations of crankcase pressure, and a suitable pressure fitting 77 connects its other end to the passage 73 to deliver to the top of the piston 63 a pressure which follows such variations of crankcase pressure. Since, as indicated above, the conduit 75 receives pressure for only a brief period in the cycle, all connections are made pressure tight, so that this pressure is maintained during the entire cycle. For this purpose, the piston 63 may be provided with circumferential sealing rings 79 to prevent the passage thereby of the crankcase mixture into the chamber 45.

Figure 11:
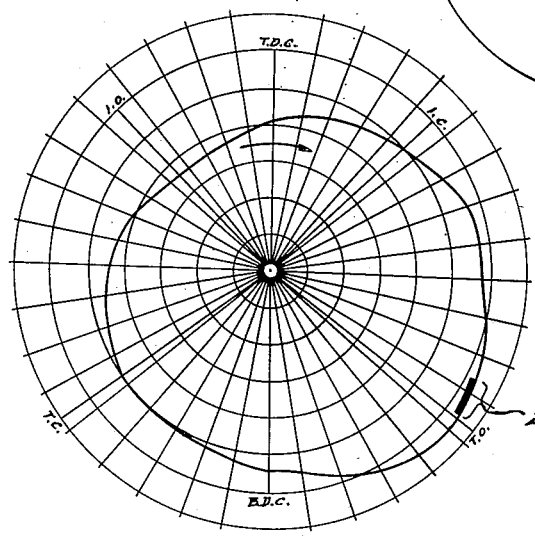
Fig. 11 is a representative polar diagram of crankcase pressures in a two-cycle engine, showing the duration of maintenance of pressure communication with the crankcase for fuel feed control.

Any of various means may be employed to effect only an intermittent pressure connection between the crankcase 21 and the pressure-responsive metering control piston 63. A simple and preferred means includes a longitudinal passage 81 which extends axially through a part of the crankshaft and opens within the crankcase through one crank cheek 23, whereby passage 81 is at crankcase pressure. The crankshaft also has a radial passage 83 communicating with and which receives pressure from the passage 81 and which is in intermittent registration with a fixed passage 85 that is formed in the bearing bushing 19 and crankcase bearing support portion 21 and to which the conduit 75 is connected by a suitable fitting 87. At a point in the cycle which is dependent upon the relative positions of the radial passage 83 and the crankpin 25, and which may be selected as indicated in Fig. 11, pressure communication is established between the crankcase 21 and cylinder 61 through the passages 81 and 83 in the crankshaft 17, fixed passage 85 in the crankcase 21 and bearing 19, and thence through conduit 75 and passage 73 to the space above piston 63. As indicated above, this operative pressure connection is preferably established at about 120° past top dead center and continues only for a period (dependent upon the sizes of the mating openings of the passages 83 and 85) sufficient to insure that the piston 63 will accurately follow inter-cyclic variations of crankcase pressure. As already indicated, because of the pressure-tight fittings, crankcase pressure is maintained on the piston 63 for the balance of the cycle after the connection between the passages 83 and 85 is broken by rotation of the crankshaft 17. The piston 63 therefore assumes a position of equilibrium dependent upon the extent to which the spring 65 must be compressed to counterbalance the force exerted on the head 67 of the piston by crankcase pressure. The position of the metering pin 47 is directly dependent on the position of the piston 63 because of their rigid interconnection through the arm 57, and is therefore directly related to and varies with changes of the pressure in the crankcase 21 at the relatively short interval of registration of the passages 83 and 85. This pressure is substantially constant during each such interval, but may vary in either direction from cycle-to-cycle, although such changes are relatively slow. Thus the metering pin only moves when the pressure at the interval of communication with the crankcase has changed from the pressure obtaining during the same interval of the preceding cycle. The movement of the metering pin is accordingly relatively slow, and therefore there is no difficulty due to the intertia of the parts such as would be encountered if pressure communication were maintained throughout the cycle.

Inasmuch as the cross-sectional areas of the pin 47 may be axially varied in any desired manner, the size of the opening through which fuel passes into the jet tube 41 and thus the weight of fuel injected per cycle may be controlled by and in any desired relation to the pressure developed in the crankcase 21. Fig. 12 is an illustrative depiction of a metering pin 47B of non-uniform taper adapted to so vary the relative rate of fuel feed through an orifice plate 41B' forming the bottom of the metering tube 41B. The passage 41A' in the tube is enlarged sufficiently so that in this embodiment it does not coact with the pin in the metering function.

A modified form of pressure-responsive mechanism for moving the metering pin is shown in Fig. 4. In this construction, the jet tube 89 is provided at its lower end with a reservoir 91 that receives fuel from the chamber 45 through a passage 93. The rate of flow through the passage 93 is under the control of the metering needle or pin 95 which has a tapered end 97 extending therein. The pin 95 has a rearwardly or upwardly presenting shoulder 99 which engages a diaphragm plate on the underside of the flexible diaphragm 101. The diaphragm 101 is disposed in mating cavities 103 in the carburetor cover 31' and a cap 105 has its outer periphery clamped between circumferential flanges on these members, as shown at 107. A combined spring retainer and upper diaphragm plate 108 is threaded on the pin 95 to clamp the diaphragm 101 against the shoulder 99. The spring 109 is inserted between the upper diaphragm plate 108 and an adjustable stop 111 which is threaded into the cap 105 and yieldably urges the pin 95 downwardly into the passage 93. The outer end of the pin 95 has a head 113 formed thereon which engages the outer end of an adjusting bushing 115 that is threaded into the stop 111. The stop 111 may be used to regulate the compression on spring 109 and thus pressure required to move the pin 95. The bushing 115 may be used to compensate for the adjustment of the stop 111 and to control the minimum size of opening which the pin 95 can produce.

Pressure is intermittently admitted by suitable means, such as that shown in Figs. 1 to 3, to the conduit 75 which is connected to a passage 73 that opens into the cavity 103 on the underside of the diaphragm 101. If this pressure is sufficient to overcome the initial setting of the spring 109, it lifts the diaphragm 101 and with it the pin 95 to control the amount of fuel admitted to the jet 89 through orifice 93 in a desired relation to the crankcase pressure. The pin 95 is provided with a close sliding fit at 117 in the cover 31' so that pressure does not leak thereby. Pressure is thus maintained substantially constant on the diaphragm 101 throughout the cycle.

In Figs. 5 to 8 pressure-responsive fuel metering mechanisms essentially similar to those already described are shown in conjunction with a two-stroke-cycle engine of the type which is described and claimed in the present inventor's Patent No. 1,986,630. This engine has a number of significant advantages over the more conventional engine already shown, several of which are pointed out in said patent. In this engine, the actual mixing of air and fuel takes place in the crankcase 21 rather than in the air intake pipe, as in the more conventional engine shown in Figs. 1-4. This is accomplished by admitting the air to the crankcase in a conventional manner through the intake passage 9 which may be under the control of a throttle valve 119 and by separately admitting fuel to the crankcase through suitable passages formed in the crankshaft 17, crankcase 21, and crankshaft bearing 19. In accordance with the present invention, the weight of fuel introduced bears a desired relation to the crankcase pressure of the preceding air-fuel charge at a predetermined point in the cycle.

As shown in Fig. 5, the crankcase structure 21' surrounding the bearing 19 is formed so as to perform substantially the functions of cover 31 previously described, although the fuel feeding means does not function as a carburetor. Thus the bearing supporting portion 21' also supports the fuel feed control housing 33. Fuel inlet metering tube 41' is mounted in a manner generally similar to the jet tube 41 of the first embodiment and the tube 41' serves as a conduit and to coact with metering valve pin 47. The other structural features of the fuel feeding and controlling means contained within the housing 33 of this embodiment, including the fuel inlet passage 49, may be similar to those already described in connection with Fig. 1 and are therefore identified by the same reference numerals. The metering pin 47 is shown as of uniform taper, but its contour may of course be varied in such manner as to vary the rate of fuel feed non-uniformly with respect to pressure changes. The crankcase section 21' has an adjusting screw 71 for the piston 63 and is provided with a passage 73 opening onto the top 67 of the piston for transfering crankcase pressure thereto. The shaft bearing 19 and the crankcase structure 21' have the fixed pressure-receiving passage 85 with which the radial passage 83 in the crankshaft 17 is in intermittent registration as heretofore described. The passages 85 and 73 are connected by a common cavity 121 suitably formed in the crankcase section 21'. In addition to the passage 85, the crankcase section 21' and the bearing 19 are, as indicated above, adapted to receive the metering tube 41, which may be threaded therein, as shown at 123, so that the tube passage 41a is also in intermittent registration with the radial crankshaft passage 83. The crankshaft passage 83 communicates with a longitudinal passage 125 in the shaft 17. This passage, unlike its counterpart, passage 81 of the first embodiment, does not open axially through the inner face of the cheek 23 but is instead connected to a radial passage 127 which opens into the crankcase through the outer periphery of the cheek 23.

Figure 6:
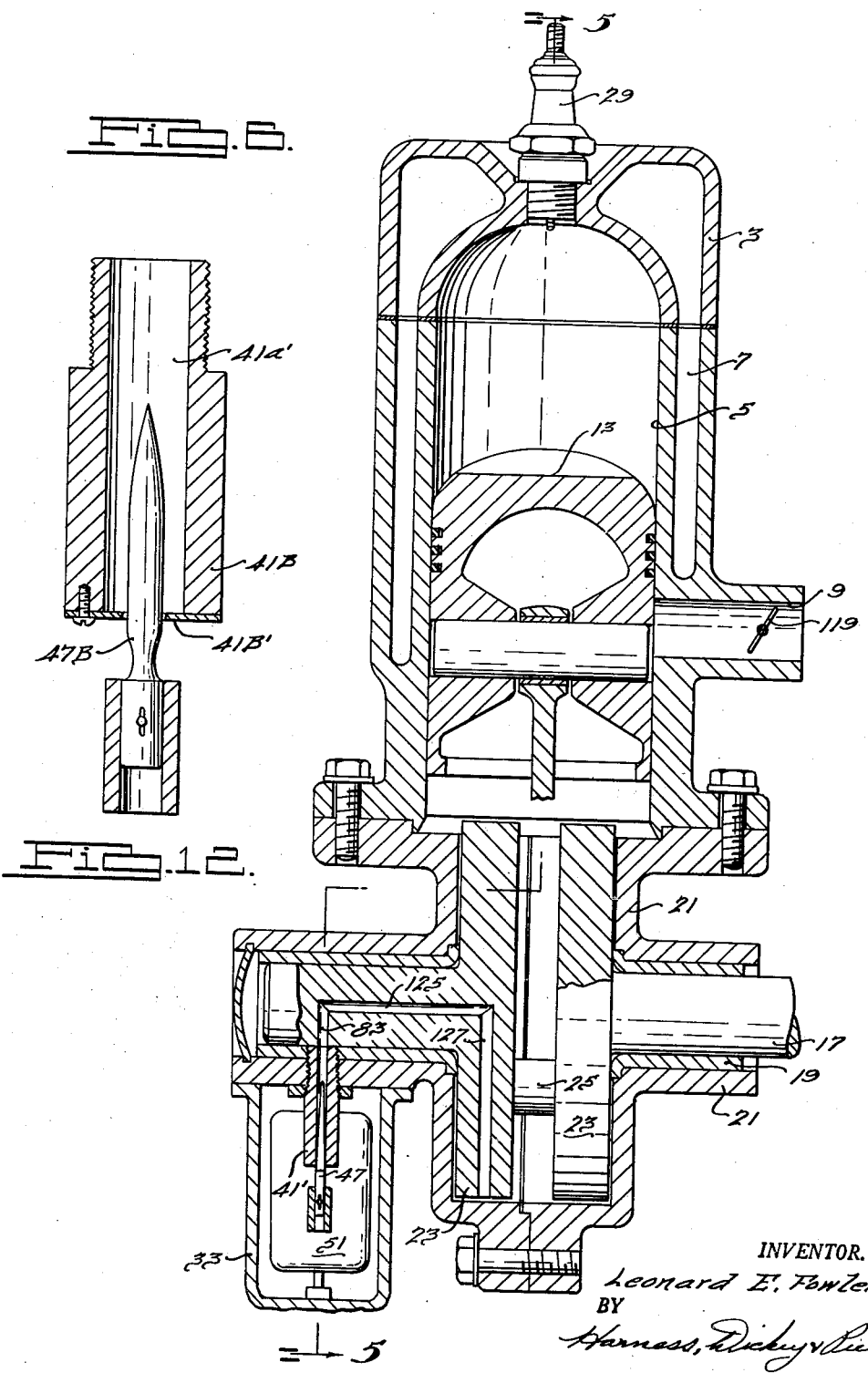
Fig. 6 is a longitudinal sectional view taken substantially as indicated by the line 6—6 of Fig. 5 and looking in the direction of the arrows.

In the construction of Figs. 5 and 6, when the passages 83 and 85 are in registration, crankcase pressure is transmitted from the shaft passages 127 and 125 through cavity 121 to passage 73 in the crankcase section 21' and thus to the top 67 of the piston 63. This moves the arm 57 and metering pin 47 to a predetermined position in the metering tube passage 41a so that a weight of fuel bearing a desired relation to the crankcase pressure may be passed through the tube 41. The tube 41 is positioned in the crankcase section 21' so that the shaft passage 83 registers therewith when the piston 13 is moving outwardly or upwardly to compress the charge which was just used to move the piston 63 and which has been transferred through passage 12 to the upper part of the cylinder 5. At this point in the cycle, the combined effect of crankcase suction and centrifugal force on fluid in passage 127 reduces the pressure in passage 83 to less than atmospheric. Thus, when the tube passage 41a and the crankshaft passage 83 register, atmospheric pressure is sufficient to force fuel through crankshaft passages 83, 125, and 127 into the crankcase. It will be evident for reasons already indicated that the rate of fluid flow through tube 41 will bear a desired relation to the crankcase pressure.

Figure 7:
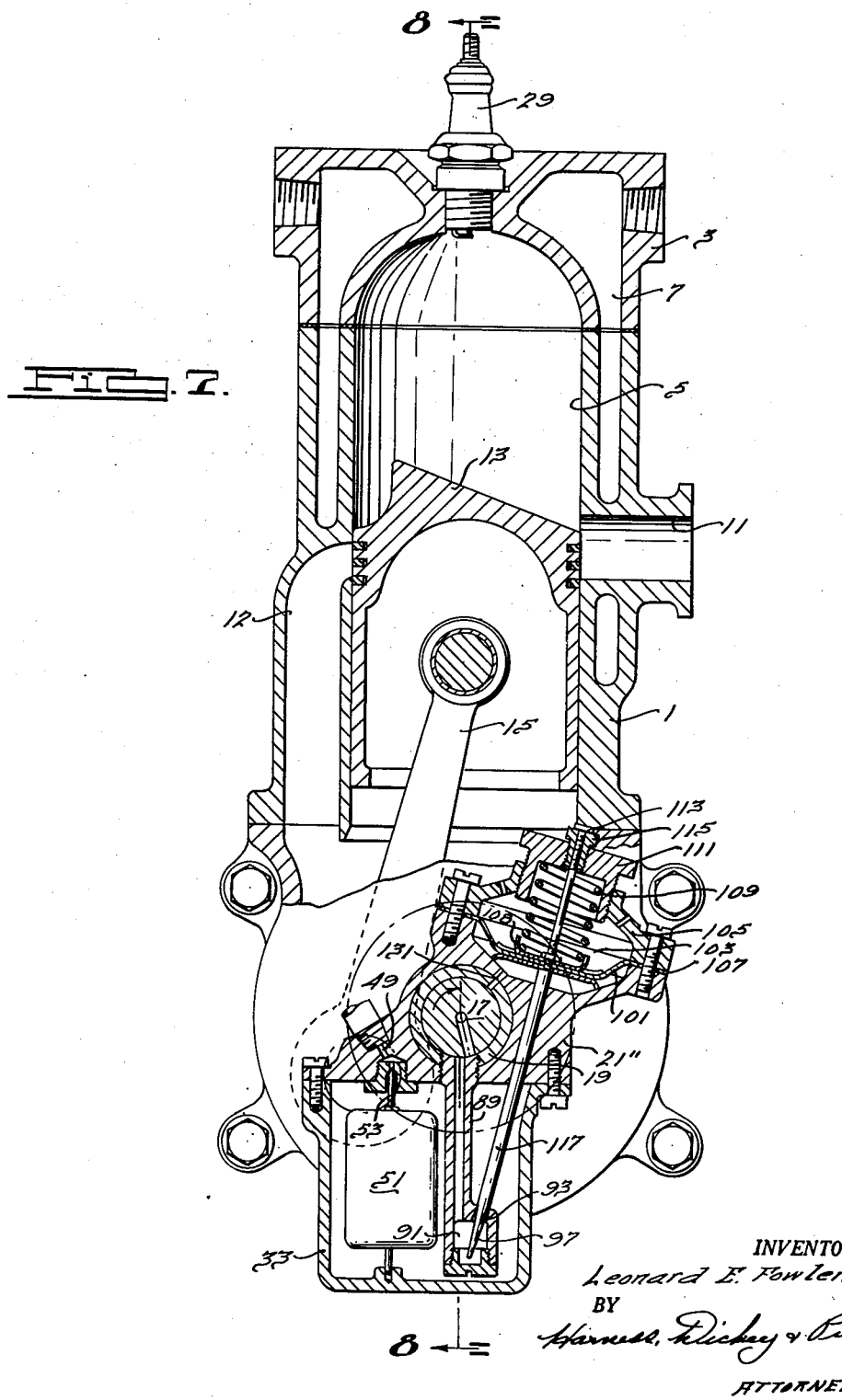
Fig. 7 is a cross-sectional view similar to Fig. 5 but showing another modified metering arrangement.
Figure 8:
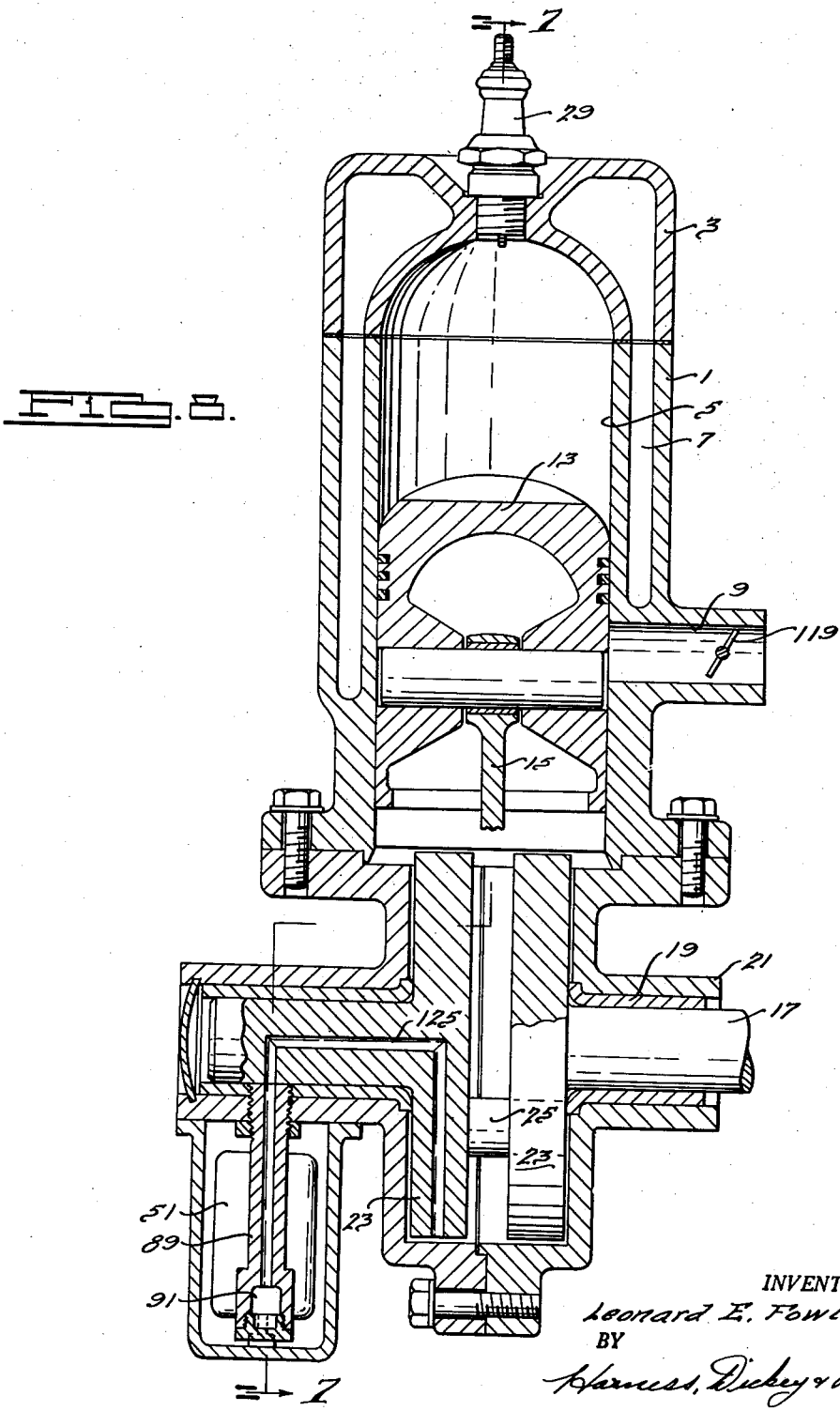
Fig. 8 is a longitudinal sectional view taken substantially as indicated by the line 8—8 of Fig. 7 and looking in the direction of the arrows.

Figs. 7 and 8 show the manner in which the engine of Patent No. 1,986,630 and the fuel-metering system of Fig. 4 may be combined, this combination being a modification of the structure shown in Figs. 5 and 6. The crankcase section 21'' is adapted to perform the functions of the cover 31' of Fig. 4, but in place of the intake passage 35 is provided with the bearing 19 which rotatably supports the crankshaft 17. A passage 131 is formed in the crankcase section 21'' and bearing 19 which is adapted to receive pressure fluid from the crankcase passage 83 and deliver it directly to the underside of the diaphragm 101, thus eliminating one of the passages 73 and 85 heretofore required for this connection. The remaining features of construction of the device shown in Figs. 7 and 8 are preferably identical to those already described. It will be recognized, therefore, that the weight of fuel mixed with each charge of air in the crankcase bears a predetermined relation to the pressure of the preceding charge.

Those skilled in the art will realize that the invention may be used with many types of engines in addition to those represented by the embodiments of Figs. 1–6. For example, in Figs. 9 and 10, it is adapted to a four-stroke-cycle engine of the T-head type, although the details of the engine are of course subject to variation, forming in themselves no part of my invention. In this embodiment it will be recognized that the pressure-responsive metering devices and carbureting mechanisms shown in Figs. 1–4 may be employed without modification, but that different means must be provided for intermittently connecting these mechanisms to the air/fuel charge being compressed in the engine cylinder, this connection being established preferably just prior to ignition.

Figure 9:
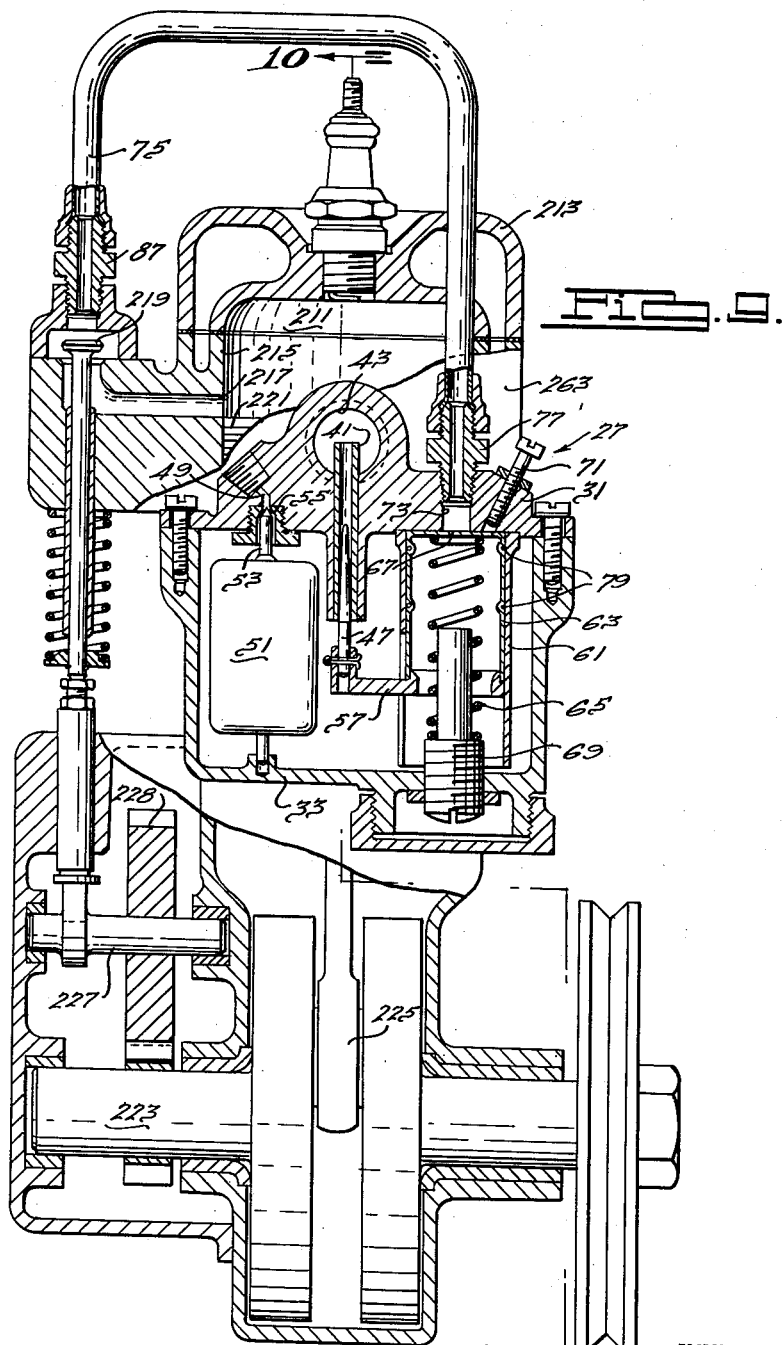
Fig. 9 is a sectional view showing a fuel metering construction embodying structure illustrated in Fig. 1 but further adapted for use in a four-stroke-cycle engine.
Figure 10:
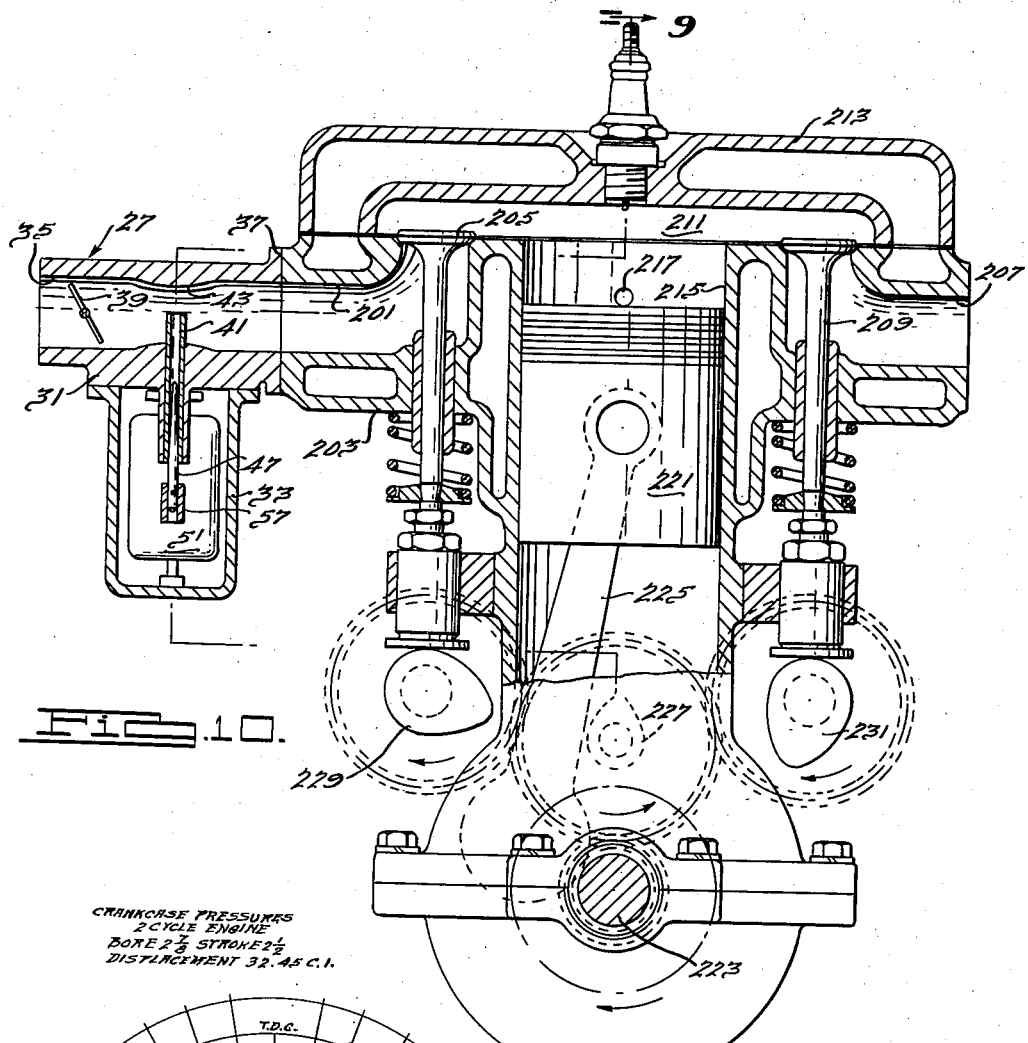
Fig. 10 is a slightly reduced cross-sectional view taken substantially on the line 10—10 of Fig. 9 looking in the direction of the arrows.

In the instant application to a four-stroke-cycle engine, the carbureting and metering mechanism 27 of Figs. 1 and 2 is used without modification, hence in Figs. 9 and 10 reference numerals that were employed in the original figures are repeated and the above discussion of the manner in which the mechanism functions is again applicable. The carbureting mechanism 27 is aligned by suitable means with the fuel mixture inlet passage 201 that is formed in the block 203 and is under the control of a conventional valve 205. An exhaust passage 207 is formed in the block 203 which is controlled by the exhaust valve 209. The passages 201 and 207 open into a cavity 211 formed on the underside of the head 213 which is in full communication with the cylinder bore 215. In order to provide pressure for actuating the fuel metering mechanism, a transverse passage 217 is formed in the block which opens into the bore 215 at a predetermined distance from top dead center. Pressure communication through the passage 217 is under the control of a suitable valve, which may be a cam-actuated poppet valve 219 as shown. The passage 217 is connected beyond the valve 219 to the pressure conduit 75 and thus provides the desired communication between the cylinder 215 and the piston 63 during the interval when the valve is open and the port 217 uncovered, which interval is preferably a relatively short one of substantially constant pressure, as previously indicated.

The piston 221 in the bore 215 drives the crankshaft 223 through the connecting rod 225. A camshaft 227 may be provided for the valve 219 and driven by a gear connection 228 with the crankshaft 223. Camshafts 229 and 231 for the intake and exhaust valves 205 and 209, respectively, may be driven through gear connections with the camshaft 227. In the conventional manner these camshafts rotate at half the speed of the crankshaft 223, hence, by proper design and positioning, the camshaft 227 may be adapted to open the valve 219 at a predetermined point in the cycle for a predetermined period. As indicated in Fig. 10, the cam of shaft 227 is positioned to operatively connect the passage 217 to the conduit 75 just prior to firing of the charge, but is designed to give only a short dwell or period during which this connection is effected. The connection thus provided by the valve 219 and passage 217 is therefore, in a functional sense, similar to that provided by the crankshaft passages 81 and 83 of the previous embodiments. Thus, the improved results hereinbefore described in connection with two-stroke-cycle engines are also obtainable in four-stroke-cycle engines by metering the inlet fuel in accordance with the pressure of the charge.

In the case of engines having direct fuel injection to the cylinders it will be understood that the fuel-feed-regulating means may readily be controlled in accordance with the principles of this invention.

It will be readily apparent that the principles of this invention may be embodied in many forms, hence the invention is not intended to be limited to the specific details of construction and application hereinbefore set forth.

What is claimed is:

1. The method of operating a two-stroke-cycle crankcase compression internal combustion engine which comprises introducing fuel to the engine and utilizing the crankcase pressure for less than about 20° during the period of about 100° to 140° past top dead center to regulate the amount of fuel introduced in a subsequent cycle.

2. The method of operating a two-stroke-cycle crankcase compression internal combustion engine which comprises introducing fuel to the engine and utilizing the crankcase pressure during the period when the crankcase is closed to regulate the amount of fuel introduced in a subsequent cycle.

3. In a two-stroke-cycle crankcase compression internal combustion engine, the combination of means providing a radial passage in a bearing portion of the crankshaft continuously connected to pressure in the crankcase, means providing a fixed passage capable of intermittent pressure-transfer communication with said radial passage, pressure-responsive means for metering fuel introduced to the engine, and pressure-transfer means operably connecting the pressure-responsive means to the fixed passage.

LEONARD E. FOWLER.

References Cited in the file of this patent

UNITED STATES PATENTS

| Number | Name | Date |
|---|---|---|
| 434,171 | Baldwin | Aug. 12, 1890 |
| 1,022,803 | Troutt | Apr. 9, 1912 |
| 2,470,709 | MacMillan | May 17, 1949 |